United States Patent [19]

Rehlander

[11] Patent Number: 4,696,661
[45] Date of Patent: Sep. 29, 1987

[54] FORWARD-REVERSE BELT TRANSMISSION

[76] Inventor: Weber Rehlander, 4922 N. Fail Rd., Laporte, Ind. 46350

[21] Appl. No.: 944,370

[22] Filed: Dec. 22, 1986

[51] Int. Cl.⁴ .............................................. F16H 11/04
[52] U.S. Cl. ........................................ 474/5; 180/6.66
[58] Field of Search ........................................ 474/1-6, 474/73, 74; 180/6.66

[56] References Cited

U.S. PATENT DOCUMENTS

| | | | |
|---|---|---|---|
| 2,924,982 | 2/1960 | Harrer | 474/5 |
| 3,477,439 | 11/1969 | Hamouz et al. | 474/5 |
| 3,722,277 | 3/1973 | Fell et al. | 474/5 |
| 3,728,905 | 4/1973 | Fell et al. | 474/5 |
| 3,938,400 | 2/1976 | Konyha | 474/5 |
| 4,038,880 | 8/1977 | Garrison | 474/5 |

Primary Examiner—Stephen J. Novosad
Assistant Examiner—Thuy M. Bui
Attorney, Agent, or Firm—Thomas J. Dodd

[57] ABSTRACT

A power transmission which includes a drive pulley and multiple driven pulleys which accommodate forward and reverse drive belts. The driven pulleys are mounted to pivoting carriages which allow relative shifting between forward and reverse and biasing springs which urge the carriages into neutral upon release of the shift lever. A clutch wheel attached to one of the driven pulleys provides for a smooth transition from neutral into forward.

10 Claims, 8 Drawing Figures

FORWARD-REVERSE BELT TRANSMISSION

SUMMARY OF THE INVENTION

This application relates to a vehicle transmission and will have special application to a forward/reverse belt-drive transmission for a lawn and garden tractor or other vehicles.

Belt-drive transmissions are useful devices for transferring rotary power from a vehicle engine to the wheels. Some previous examples of belt transmissions are disclosed in U.S. Pat. Nos. 3,722,277; 3,278,905; 3,938,400; and 4,128,866.

The belt-drive transmission of this invention includes dual belts which extend about the engine crankshaft and a series of idler pulleys. The pulleys are connected to a pair of carriage assemblies which are pivotable about the engine crankshaft. A clutch wheel is connected to the assembly and serves to provide a smooth transition of the vehicle from neutral into forward.

Accordingly, it is an object of this invention to provide for an improved belt-drive transmission.

Another object of this invention is to provide for a belt-drive transmission which has a spring biased control lever and can be operated with minimal effort.

Another object of this invention is to provide for a smooth engaging V-belt transmission.

Still another object of this invention is to provide a long lasting, highly economical belt-drive transmission for a lawn and garden tractor, or other vehicles.

And yet another object of this invention is to provide a safer, more reliable belt-drive transmission.

Other objects of this invention will become apparent upon a reading of the following description.

BRIEF DESCRIPTION OF THE DRAWINGS

A preferred embodiment of the invention has been depicted for illustrative purposes wherein.

DESCRIPTION OF THE PREFERRED EMBODIMENT

The preferred embodiment herein described is not intended to be exhaustive or to limit the invention to the precise form disclosed. It is chosen and described to explain the principles of the invention and its application and practical use to thereby enable others skilled in the art to utilize the invention.

Figure 5:
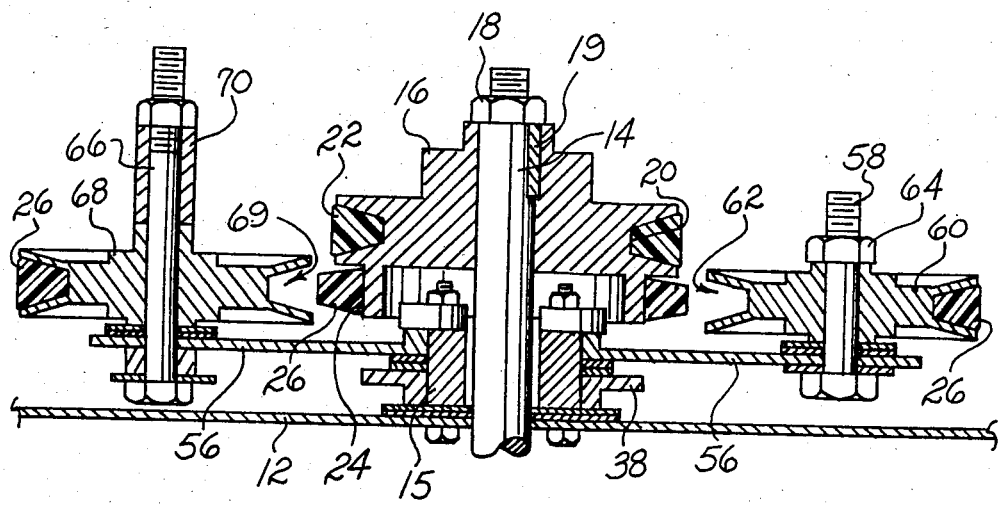
FIG. 5 is a fragmentary sectional view taken along line 5—5 of FIG. 2.

Referring now to the drawings, the reference numeral 10 generally designates the belt-drive transmission of this invention as seen from below a vehicle such as a lawn and garden tractor (not shown). Transmission 10 is secured to the underside of the frame 12 of the vehicle. A drive member or shaft 14 extends downwardly from the vehicle engine (not shown) through frame 12 and bearing 15 and drive pulley 16 secured to shaft 14 by nut 18 and a key 19. Drive pulley 16 as shown in FIG. 5 includes a continuous peripheral grove 20 which accommodates a forward drive belt 22 and a coaxial recessed shoulder part 24 which accommodates reverse drive belt 26.

Figure 6:
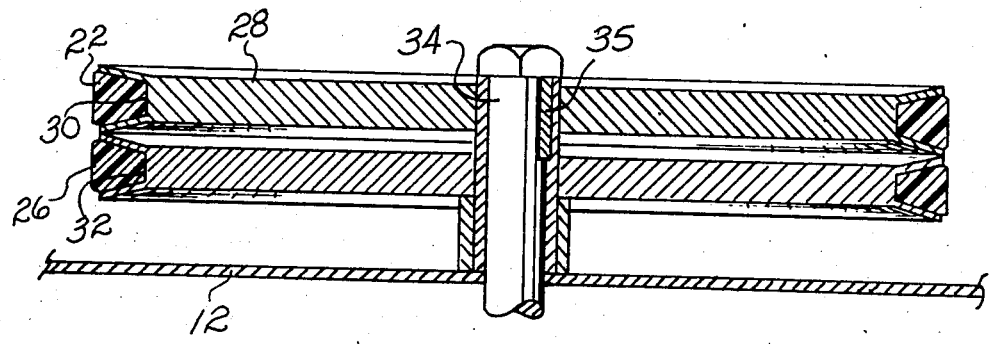
FIG. 6 is a fragmentary sectional view taken along line 6—6 of FIG. 2.
Figure 7:
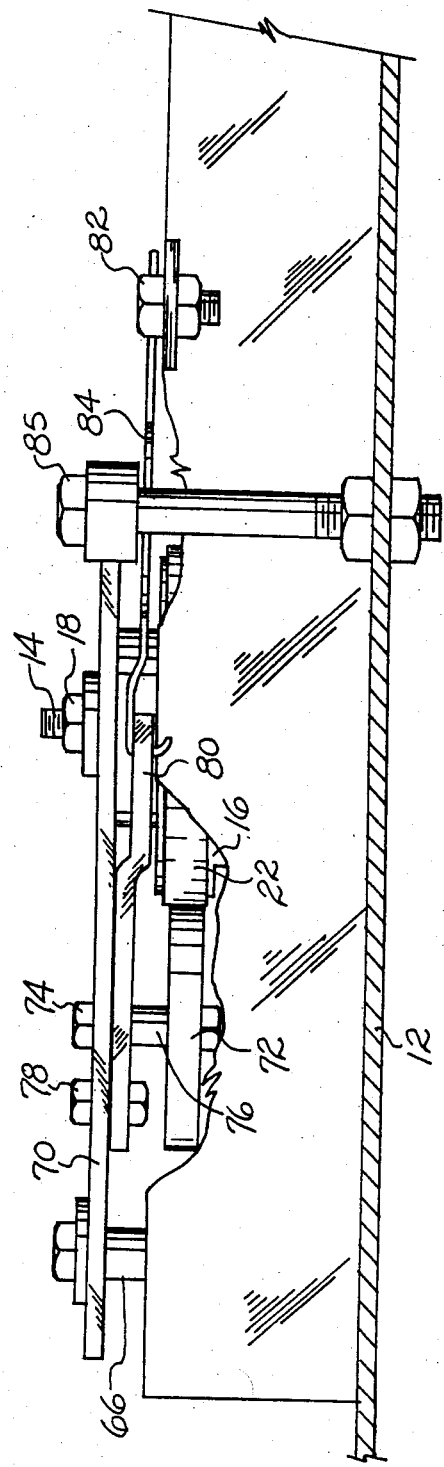
FIG. 7. is a fragmentary sectional view taken along line 7—7 of FIG. 2 with portions of the guard broken away to illustrate the clutch assembly.

Transmission 10 also includes a dual pulley 28 (FIG. 6) which includes two coaxial peripheral grooves 30 and 32 which accommodate drive belts 22 and 26. Pulley 28 is connected to a shaft 34 by a key 35. Shaft 34 through suitable gearing drives the vehicle wheels (not shown).

Figure 8:
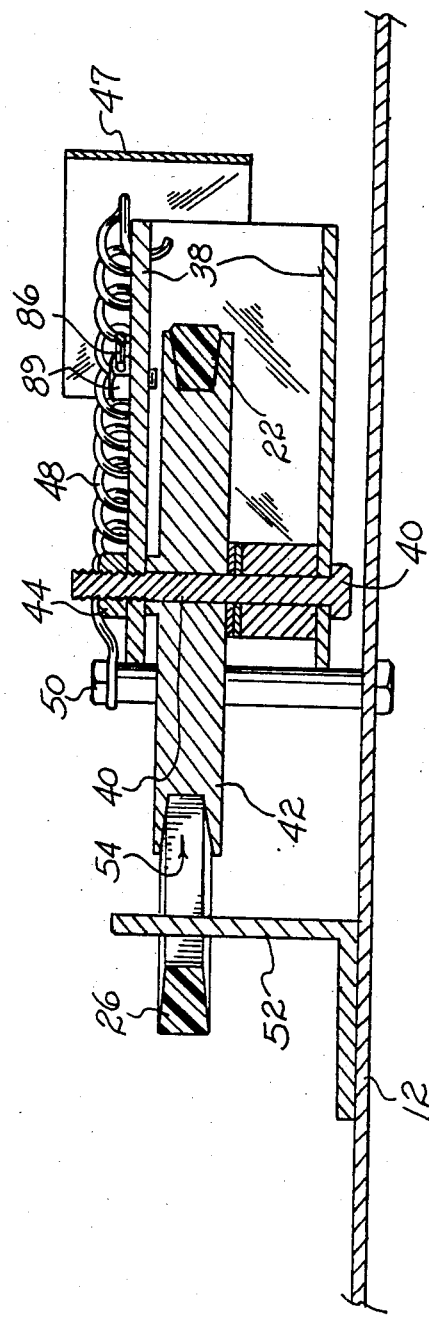
FIG. 8 is a fragmentary sectional view taken along line 8—8 of FIG. 2.

A carriage 38 is pivotably mounted about crank shaft bearing 15. A shaft 40 is secured to carriage 38 and houses a forward idler pulley 42 which is rotatably secured to shaft 40 by nut 44. Carriage 38 also has forward belt guide parts 46,47 and is biased for pivoting movement about bearing 15 by a helical spring 48 connected between carriage 38 and a bolt 50 which extends from frame 12. A stop bracket 52 secured to frame 12 limits counterclockwise pivotal movement of carriage 38 about bearing 15. Forward idler pulley 42 includes a continuous peripheral groove 54 which accommodates belt 22 as shown in FIG. 8.

A second carriage 56 is pivotally mounted about crank shaft bearing 15 adjacent to carriage 38. A shaft 58 extends through carriage 56 and carries a rotatable reverse idler pulley 60 which has a continuous peripheral groove 62 to accommodate reverse drive belt 26. Pulley 60 is secured to shaft 58 by nut 64. A second shaft 66 accommodates a reverse idler pulley 68 which has a continuous groove 69. Shaft 66 projects well beyond pulley 68 and houses a clutch bar 70. Clutch bar 70 extends from shaft 66 in a perpendicular orientation generally towards pulley 60. A clutch wheel 72 is rotatably secured to bar 70 by bolt 74 and bushing 76. Clutch bar 70 includes an offset bar part 80 secured to bar 70 by bolt 78 and which is connected to frame 12 through bolt 82 and a biasing spring 84. Carriages 38 and 56 are connected for relative pivotal movement by a helical spring 86 which is attached to bolts 88,89 extending from the respective carriages. Bolt 89 is fitted in a notch 39 of carriage 38 to allow correlative movement of the carriages 38,56 in a clockwise direction while permitting relative movement of carriage 56 in a counterclockwise direction.

A shift rod 92 is connected to pulley shaft 66 at one end and to a pivot bolt 94 at its other end. A pivot bolt 96 is connected to frame 12 and accommodates the shifting linkage 98 of transmission. Linkage 98 includes links 100,102 and 104 connected by pivot bolts 94 and 106 as shown in the drawings. Link 100 is connected via bolt 108 to the shift lever (not shown) of the vehicle (not shown). Link 102 includes a notch 110 which interacts with bolt 112 as shown in FIG. 3 to "lock" the transmission in forward until the shift lever (not shown) is shifted back into neutral.

Figure 1:
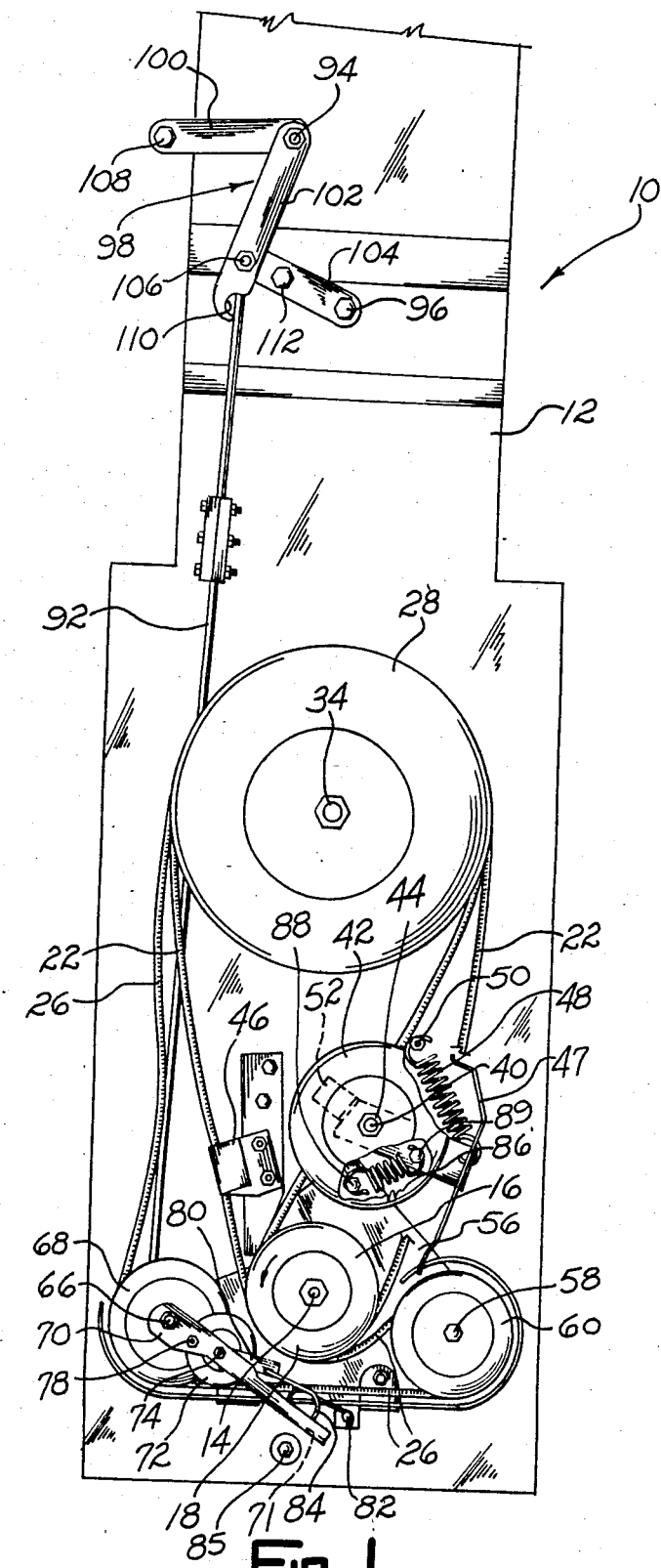
FIG. 1 is a fragmentary plan view of the transmission in a neutral position.
Figure 2:
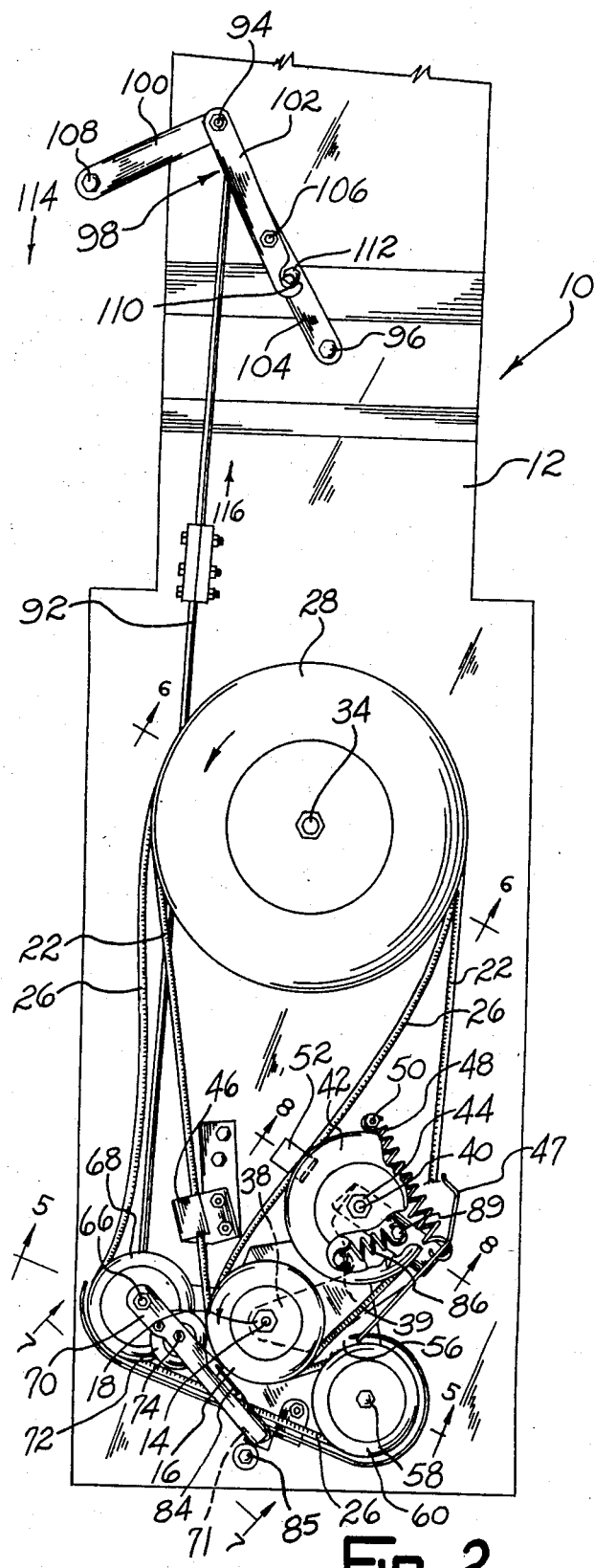
FIG. 2 is a fragmentary plan view of the transmission shown being shifted into its forward position.
Figure 3:
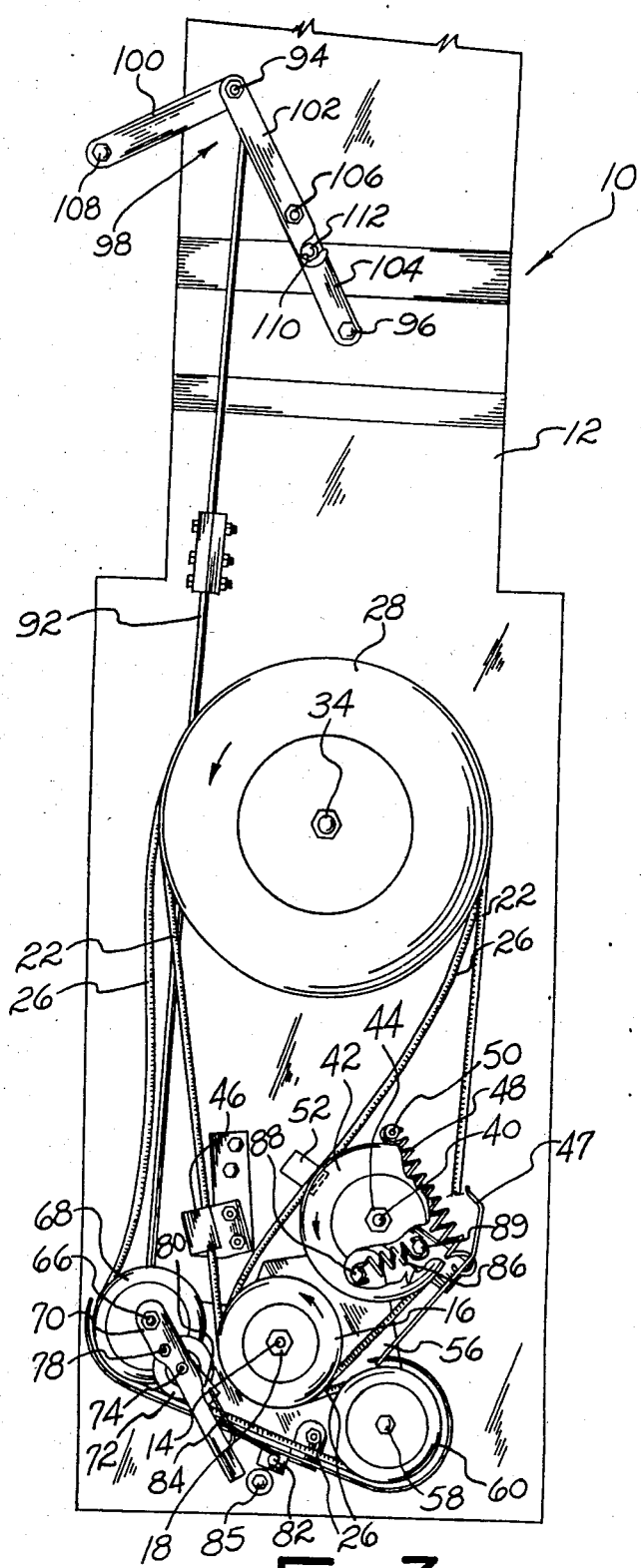
FIG. 3 is a fragmentary plan view of the transmission in its forward position.

FIGS. 1-3 sequentially depict the shifting of transmission 10 from its neutral position (FIG. 1) to its full forward position (FIG. 3). In the neutral position of FIG. 1, both belts 22 and 26 are slack and neither forward nor reverse movement is transmitted to driven dual belt pulley 28 and to the vehicle wheels (not shown). FIG. 2 depicts the action of clutch wheel 72 just prior to its engaging forward belt 22. Bolt 108 has been shifted in the direction of arrow 114 (FIG. 2) to shift rod 92 in the direction of arrow 116. This action shifts both carriages 38,56 to the right (as seen in the drawings), and draws clutch wheel 72 into momentary contact with forward drive belt 22. When the terminal end 71 of clutch rod 70 clears clutch bearing 85, clutch wheel 72 is released from contact with belt 22 (FIG. 3) and transmission 10 shifts into forward with pulleys 28,42 rotating in a counterclockwise fashion and notch-bolt 110,112 securing the transmission in this position until manual disengagement. Reverse belt 26 remains slackened in this position.

Figure 4:
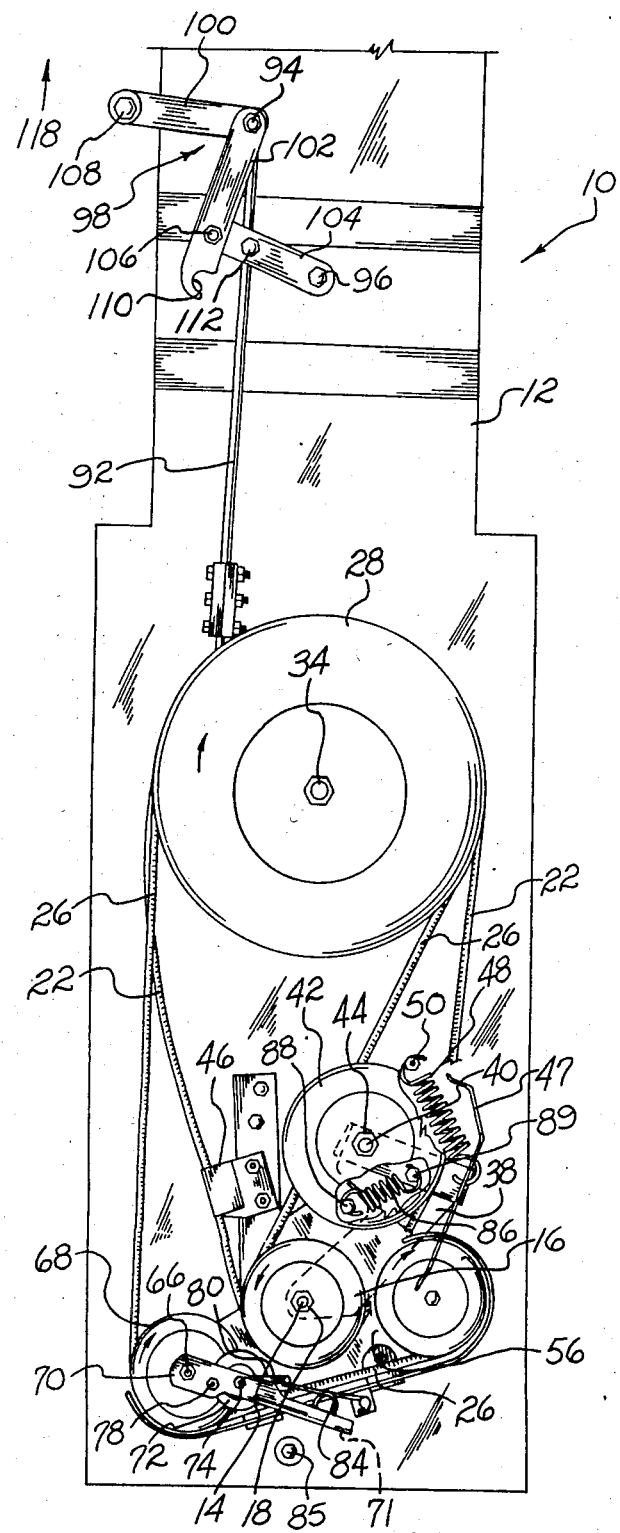
FIG. 4 is a fragmentary plan view of the transmission in its reverse position.

FIG. 4 depicts the transmission 10 shifted into its reverse position. In this position, shift 92 has been moved in the direction of arrow 118 to shift carriage 56 in a counterclockwise fashion (as shown in the drawing) to tighten reverse drive belt 26 and slacken forward belt 22. In this position, with reverse belt 26 riding on shoulder 24 of crankshaft pulley drive pulley 16, and in grooves 32,62 and 69 of pulleys 28,60 and 68, the counterclockwise rotation of crank shaft 14 imparts a clockwise rotation of pulley 28 to drive the vehicle (not shown) in reverse direction. When the shift lever (not shown) is released, carriage 56 is urged back to the neutral position of FIG. 1 by spring 86 with bolt 89 contacting carriage 38 to secure the carriages and pulleys in their neutral position.

It is understood that the invention is not limited to the details above given, but may be modified within the scope of the following claims.

I claim:

1. In a power transmission including a rotatable drive member, first and second rotatable driven members, first belt means connected between said drive member and first and second driven members for effecting rotation of the first driven member in a first direction, third and fourth rotatable driven members positioned adjacent said drive member, and second belt means connected between said drive member and said first, third and fourth driven members for effecting rotation of said first driven member in a second direction opposite that of said first direction, the improvement comprising a clutch member carried by one of said third and fourth driven members for pivotal movement relative to said drive member, said third and fourth driven members positioned on opposite sides of said drive member and pivotally movable relative to the drive member, and means for shifting said second, third and fourth driven members between a neutral position wherein no tension is placed on either of said belt means and said first driven member is stationary, a forward position wherein said second driven member exerts tension on said first belt means to effect rotation of said first driven member in its said first direction, and a reverse position wherein said third and fourth driven members exert tension on said second belt means to effect rotation of said first driven means in its said second direction, said clutch member constituting means for momentarily engaging said first belt means as said third and fourth driven members are shifted from their said neutral position into their said forward position wherein a smooth transmission from neutral into forward is achieved.

2. The power transmission of claim 1 wherein said shifting means includes a linkage and a shift lever, a rod connected between one of said second and third driven members and said shift lever, said linkage for transmitting motion of said shift lever to said second and third driven member.

3. The power transmission of claim 2 wherein said linkage includes a first link connected to said shift lever, a second link pivotally connected to said first link and to said rod, and a third link pivotally connected to said second link and to a vehicle support frame, said third link including a projection, said second link terminating in a notch means for accepting said projection to lock the second and third driven means in their said forward position.

4. The power transmission of claim 1 wherein said drive member is a pulley connected to a vehicle crank shaft, said pulley having a peripheral groove which accommodates said first belt means and a continuous recessed shoulder which accommodates said second belt means.

5. The power transmission of claim 4 wherein said first driven member is a pulley having dual adjacent peripheral grooves which accommodate said first and second belt means, and said second and third driven members are idler pulleys, each having a continuous peripheral groove which accommodates said second belt means.

6. The power transmission of claim 1 wherein said clutch member is a rotatable pulley, a bar member connected to one of said second and third driven members, said clutch member connected to said bar member, and biasing means associated with said clutch member and bar for regulating contact of the clutch member with said first belt means during shifting of said second and third driven members into the forward position.

7. The power transmission of claim 5 and a carriage pivotally connected about said vehicle crank shaft adjacent said drive member, said carriage carrying said second and third driven members.

8. The power transmission of claim 7 and a second carriage pivotally connected about said crank shaft adjacent said first carriage, said second carriage carrying said fourth driven member, and biasing means connecting said first and second carriages for urging said carriages and driven members towards their neutral position.

9. The power transmission of claim 8 and means associated with said second carriage for guiding said first belt means between said driven member and said first and fourth drive members.

10. The power transmission of claim 1 wherein said first and second belt means are V-belts.

* * * * *